US012612036B2

(12) United States Patent　　(10) Patent No.: US 12,612,036 B2
Liu et al.　　(45) Date of Patent: Apr. 28, 2026

(54) DIVERSE FUTURE PREDICTIONS FOR PEDESTRIANS

(71) Applicant: NEC Laboratories America, Inc., Princeton, NJ (US)

(72) Inventors: Buyu Liu, Cupertino, CA (US); Sriram Nochur Narayanan, San Jose, CA (US); Bingbing Zhuang, Santa Clara, CA (US); Yumin Suh, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 47 days.

(21) Appl. No.: 18/639,307

(22) Filed: Apr. 18, 2024

(65) Prior Publication Data

US 2024/0351582 A1　　Oct. 24, 2024

Related U.S. Application Data

(60) Provisional application No. 63/460,647, filed on Apr. 20, 2023.

(51) Int. Cl.
*B60W 30/09* (2012.01)
*B60W 30/095* (2012.01)
*B60W 50/00* (2006.01)
*G06V 20/56* (2022.01)

(52) U.S. Cl.
CPC ........ *B60W 30/09* (2013.01); *B60W 30/0956* (2013.01); *B60W 50/0097* (2013.01); *G06V 20/588* (2022.01)

(58) Field of Classification Search
None
See application file for complete search history.

(56) References Cited

U.S. PATENT DOCUMENTS

| | | | | |
|---|---|---|---|---|
| 12,311,925 | B2 * | 5/2025 | Narayanan | G06F 16/29 |
| 12,459,536 | B1 * | 11/2025 | Sun | G05B 13/0265 |
| 2018/0124423 | A1 * | 5/2018 | Choi | G06T 7/20 |
| 2019/0138830 | A1 * | 5/2019 | Justice | G06V 10/82 |
| 2020/0012881 | A1 * | 1/2020 | Justice | G06N 20/00 |
| 2022/0144256 | A1 * | 5/2022 | Narayanan | G08G 1/166 |

(Continued)

FOREIGN PATENT DOCUMENTS

| | | | | | |
|---|---|---|---|---|---|
| CN | 117409286 | A | * | 1/2024 | G06V 10/806 |
| CN | 117409286 | B | * | 3/2024 | G06V 10/806 |
| DE | 112021005894 | T5 | * | 9/2023 | G06N 3/0442 |

(Continued)

OTHER PUBLICATIONS

Narayanan et al., "Divide-and-Conquer for Lane-Aware Diverse Trajectory Prediction", arXiv:2104.08277v1 [cs.CV] Apr. 16, 2021, pp. 1-14.

*Primary Examiner* — Kevin R Steckbauer
(74) *Attorney, Agent, or Firm* — Vincent Duffy; Joseph Kolodka

(57) ABSTRACT

Methods and systems for trajectory prediction include encoding trajectories of agents in a scene from past images of the scene. Lane centerlines are encoded for agents in the scene. The agents in the scene are encoded using the encoded trajectories and the encoded lane centerlines. A hypercolumn trajectory is decoded from the encoded agents to generate predicted trajectories for the agents. A vehicle is automatically operated responsive to the predicted trajectories.

14 Claims, 6 Drawing Sheets

(56)           References Cited

U.S. PATENT DOCUMENTS

| | | | | |
|---|---|---|---|---|
| 2024/0351582 A1 * | 10/2024 | Liu | ........................ | B60W 30/09 |
| 2025/0115278 A1 * | 4/2025 | Pittaluga | ........... | B60W 60/0027 |

FOREIGN PATENT DOCUMENTS

| | | | | | |
|---|---|---|---|---|---|
| JP | 2023546722 A | * | 11/2023 | ........... | G06N 3/0442 |
| JP | 7539575 B2 | * | 8/2024 | ........... | G06N 3/0442 |
| WO | WO-2022103737 A1 | * | 5/2022 | ............. | G06N 3/045 |
| WO | WO-2024220765 A1 | * | 10/2024 | ........ | B60W 30/0956 |
| WO | WO-2025076342 A1 | * | 4/2025 | ............. | G06N 3/044 |

* cited by examiner

Trajectory prediction model(s)
600

Trajectory prediction model(s)
700

DIVERSE FUTURE PREDICTIONS FOR PEDESTRIANS

RELATED APPLICATION INFORMATION

This application claims priority to 63/460,647, filed on Apr. 20, 2023, incorporated herein by reference in its entirety.

BACKGROUND

Technical Field

The present invention relates to path prediction and, more particularly, to predicting pedestrians' future paths.

Description of the Related Art

Tracking and predicting the movement of pedestrians is a high priority for autonomous and self-driving vehicles. In contrast to road features and fixed obstructions, pedestrians may move in unpredictable ways, which can change the circumstances of a road scene instantaneously. The consequences of striking a pedestrian can be catastrophic, and last-minute attempts to avoid collision with the pedestrian by the vehicle can result in significant damage to the vehicle itself, other vehicles, their passengers, and the surrounding environment.

SUMMARY

A method for trajectory prediction includes encoding trajectories of agents in a scene from past images of the scene. Lane centerlines are encoded for agents in the scene. The agents in the scene are encoded using the encoded trajectories and the encoded lane centerlines. A hypercolumn trajectory is decoded from the encoded agents to generate predicted trajectories for the agents. A vehicle is automatically operated responsive to the predicted trajectories.

A system for trajectory prediction includes a hardware processor and a memory that stores a computer program. When executed by the hardware processor, the computer program causes the hardware processor to encode trajectories of agents in a scene from past images of the scene, to encode lane centerlines for agents in the scene, to encode the agents in the scene using the encoded trajectories and the encoded lane centerlines, to decode a hypercolumn trajectory from the encoded agents to generate predicted trajectories for the agents, and to automatically operate a vehicle responsive to the predicted trajectories.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Trajectories for pedestrians may be predicted based on perspective videos. Past trajectories for specific pedestrians may be tracked and parsed to produce future trajectories. The predicted future trajectories can then be used by an autonomous or self-driving vehicle to anticipate the path that pedestrians will take and to navigate safely around them.

To accomplish this, an anchor lane network for pedestrians may use lane centerlines in captured images, as well as past trajectories, to provide the future trajectory outputs for agents present in a road scene. A convolutional encoder may take a top-down map, along with feature outputs from every agent for their past trajectory and anchor encoders. Interactions between the agents can be modeled along with scene context. Predictions may be ranked using a diversity-based ranking to provide scores for each output trajectory.

Figure 1:
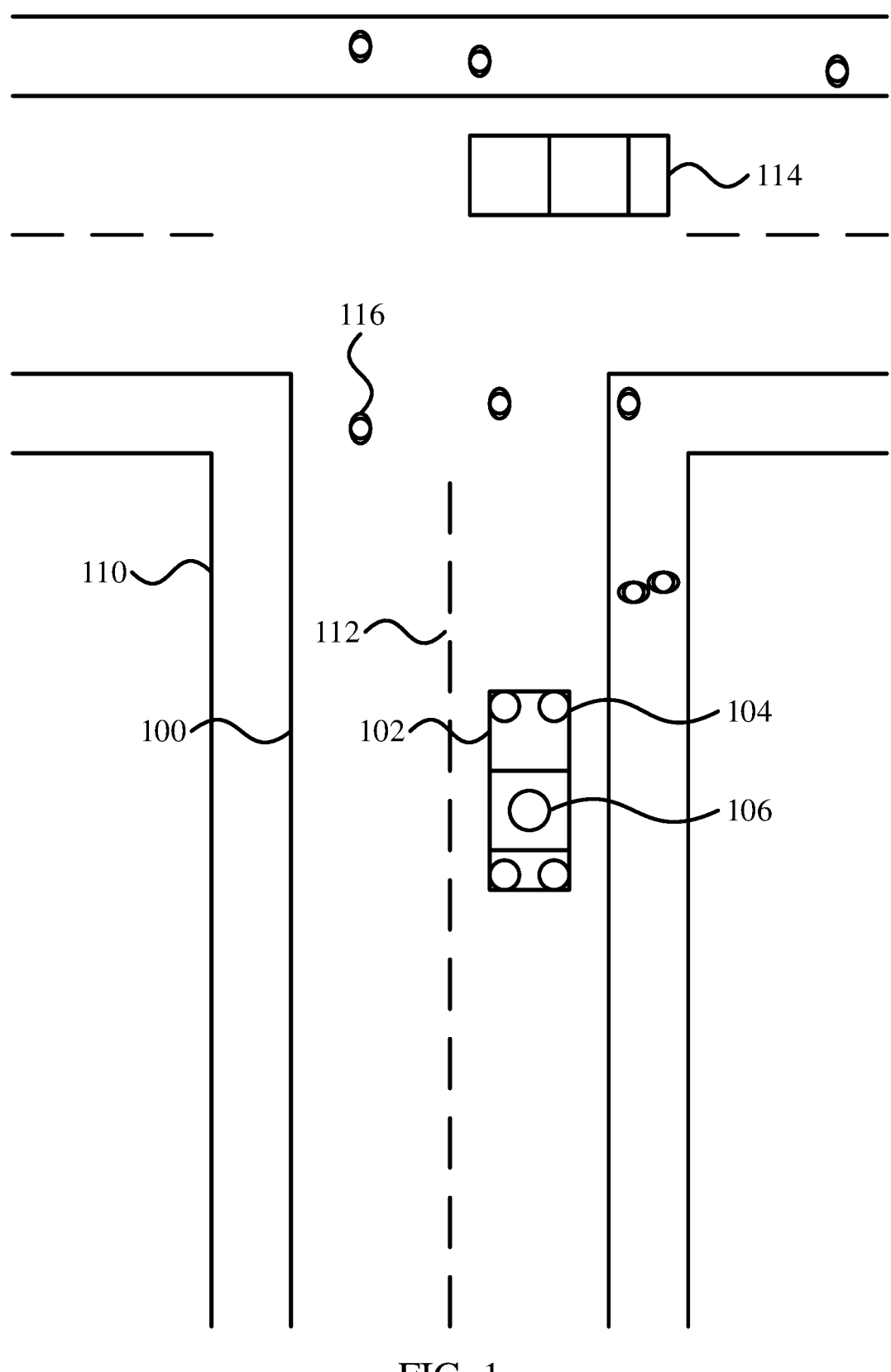
FIG. 1 is a top-down view of a road scene that includes a self-driving vehicle and a number of pedestrians, in accordance with an embodiment of the present invention.

Referring now to FIG. 1, an exemplary road scene is shown. A vehicle 102 operates on a road 100. The vehicle 102 is equipped with sensors that collect information about the road 100. For example, the vehicle 102 may include several video cameras 104, positioned at different locations around the vehicle, to obtain visual information about the road 100 from multiple different perspectives and to provide a wide area of the scene. The vehicle 102 may further include a 360-degree LiDAR sensor 106, positioned to gather geometric information about the road 100 all around the vehicle 102.

The vehicle 102 records information from its sensors. The sensors may collect information relating to other objects in the environment, such as other vehicles 114, structural features such as lamp posts, as well as animals and pedestrians 116. Mobile objects, such as vehicles 114 and pedestrians 116, may be referred to herein as agents. The sensors additionally track information relating to the road 100 itself, such as lane markings 112 and any defects in the road. The sidewalk 110 may similarly be identified, and pedestrians' positions and trajectories relative to the sidewalk 110 and the lane markings 112 may be tracked and predicted.

Figure 2:
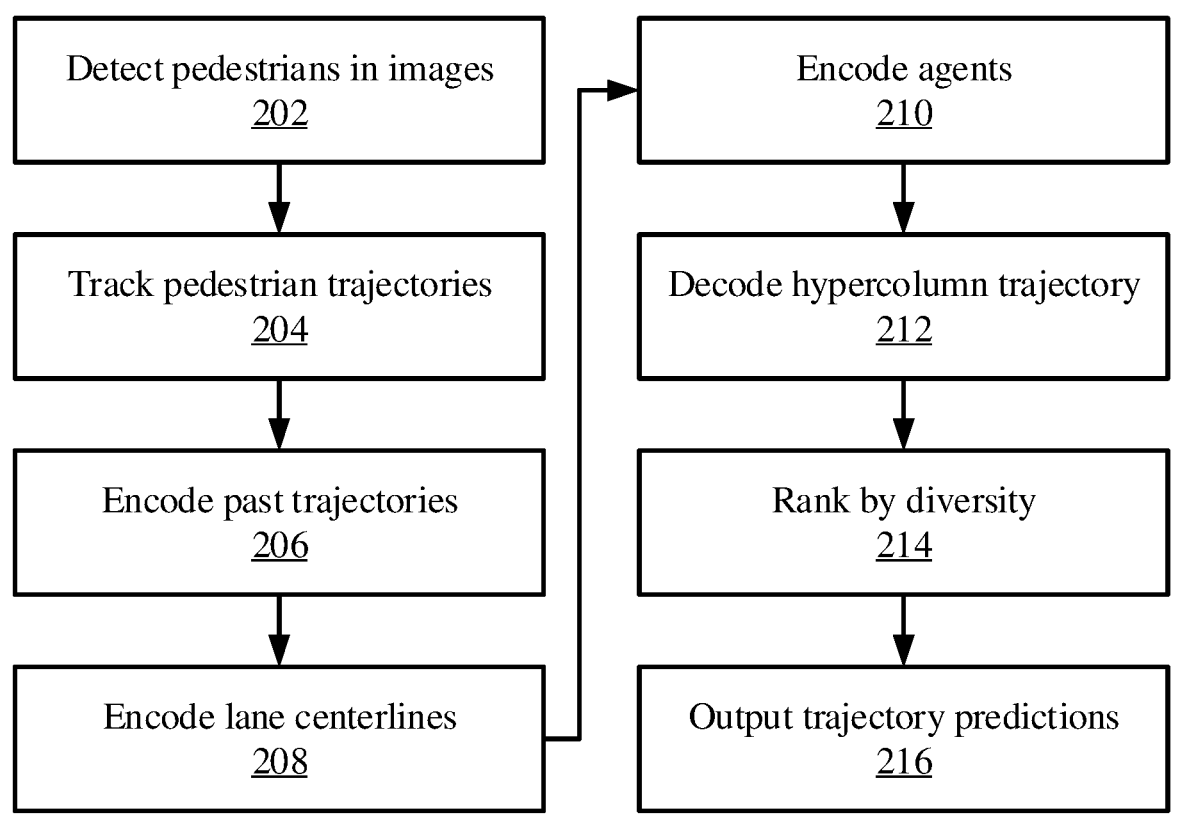
FIG. 2 is a block/flow diagram of a method for predicting trajectories for agents in a road scene, in accordance with an embodiment of the present invention.

Referring now to FIG. 2, a method for predicting pedestrian trajectories is shown. Block 202 detects pedestrians in a series of images, for example images captured by a vehicle's camera(s) 104. The detection may generate a two-dimensional or three-dimensional bounding box for each detected pedestrian across the images of a video sequence. For example, a "you only look once" object detection process may frame objected detection as a regression problem to spatially separated bounding boxes and associated class probabilities. A neural network may predict bounding boxes and class probabilities directly from full images in a single evaluation. Using a two-dimensional bounding box prediction, a depth can be predicted to map the bounding boxes to three-dimensional spaces.

Block 204 tracks pedestrians' trajectories across time. This tracking may be performed using the bounding boxes of block 202, generating a unique identifier for each detected pedestrian and applying that identifier to the bounding boxes associated with the respective pedestrian to track the pedestrian until they leave the view of the camera 104. For example, similarities with tracklets can be used to recover true objects and to filter out background detections, such that a low-score bounding box need not be thrown away if it connects to bounding boxes with the same identifier in different frames. A tracklet is an instance of a pedestrian or vehicle with a location that is tracked across different frames. This can help prevent trajectory fragmentation.

Block 206 encodes the past trajectories of the detected pedestrians, extrapolating based on previous locations of the pedestrians. Temporal units may be embedded with a multi-layer perceptron (MLP) and may then be passed to a long-short term memory (LSTM) network to provide a past state vector.

Block 208 encodes the centerline of all possible lanes, as well as the past trajectories as input, and generates lane-based features. The centerlines include a line along two points, the fitted lines from the points over a period of time (e.g., 2 seconds), and centerlines from nearby walkways, which may be bidirectional. The length of centerlines may be limited to predetermined value, such as 20 meters, reflecting the assumption that humans are unlikely to move father than a predetermined distance over a given period of time. The centerline may be encoded for each pedestrian through a series of one-dimensional convolutions to produce respective embedded vectors. The past trajectories for this encoding may be derived from the tracklet information. The output of the past trajectory encoding and the centerline encoding may be concatenated together.

Two types of lane may be defined for pedestrians, including one type that is fitted from a segmentation map of walkways, sidewalks, and crosswalks, and another type that is obtained from the pedestrian's past trajectory. For the first type, semantics may be defined where pedestrian travel is expected. For example, sidewalks and crosswalks are areas where pedestrians normally walk, whereas walking down the center of a road is not. On each such semantic region, identified as a lane of the first type, a centerline may be identified by interpolation. This centerline may be regarded as a fitted line where predictions are used as anchors. For pedestrian prediction there will be two fitted lines, since the region is bidirectional. In practice, the region closest to the pedestrian and its corresponding two fitted lines may be used as anchors.

As to the second type of lane, being derived from past trajectories, the centerline may be obtained by fitting from locations of the pedestrian in the recent past (e.g., 2 seconds). After obtaining the past trajectories for the pedestrian, a ray may be fit from the last two measured locations. Points along this ray are identified as points along a center line of the second type of lane.

Block 210 performs multi-agent convolutional encoding, creating a single representation of an entire scene by concatenating feature outputs from the past trajectory and the centerline encoding in the channel dimension, along with the top-down view map. Block 210 thereby captures interactions and scene context of all agents in a single forward pass.

Agent-specific information may be encoded at respective locations in a grid. This produces an exemplary scene state map of dimensions H×W×128, where H and W refer to the pixel dimensions of the input images, containing information about every agent in the scene. In this case, the number 128 represents a feature dimension length from the combination of features from the past trajectory encoding and the centerline encoding. This number may be changed to any appropriate value corresponding to such features. This map is processed by a convolutional encoder along with the rasterized map to produce activations at different feature scales. To calculate feature vectors of each individual agent, hypercolumn descriptors may be adapted from their locations. The hypercolumn descriptor includes features extracted at different scales by bi-linearly interpolating different feature dimensions. This can capture interactions at different scales, with higher convolutional layers capturing the global context and with low-level features retaining nearby interactions.

Block 212 decodes a hypercolumn trajectory, using multiple 1×1 convolutions to produce outputs for every individual agent. The decoder makes use of hypercolumn descriptors obtained from the multi-agent convolutional encoding. In some embodiments, trajectories may be predicted in the direction of a lane using normal-tangential coordinates, while other embodiments may provide auxiliary xy predictions in a Cartesian coordinate system. Linear values can correspond to trajectories of higher degrees, based on the input anchor. Two normal-tangential trajectories having the same values can have completely different dynamics. Thus the auxiliary predictions can be used to regularize the anchor-based outputs to make the network aware of agent dynamics, reducing the susceptibility to bad actors.

Block 214 ranks the trajectories, for example using an inverse optical control-based ranking based on scores predicted for each output trajectory. Features from the hypercolumn trajectory decoding 212 may be used as inputs. Diversity ranking jointly considers the trajectory probabilities and their diversity.

This diversity ranking may be implemented as a greedy method that selects the top-K trajectories, such that they are far as possible from one another and of sufficiently high probability. The greedy selection process may be formulated as a multi-step procedure where, at each step, a prediction is selected which has the maximum averaged L2 difference with respect to the predictions in a pool of previously selected trajectories. The pool may be initialized with a predetermined number of trajectories having the largest probabilities.

Block 216 outputs the selected trajectory predictions. The hypercolumn trajectory decoding 212 outputs anchor-based trajectories predicted in normal-tangential coordinates with respect to the input lanes. These predictions provide tight semantic coupling of the trajectories with the road. Auxiliary coordinates may be predicted in global cartesian xy coordinates of the map to regularize the anchor outputs. Thus two trajectories having the same normal-tangential coordinate values can have different dynamics, and linear values in normal-tangential coordinates can correspond to trajectories of higher degrees based on the input anchor.

Figure 3:
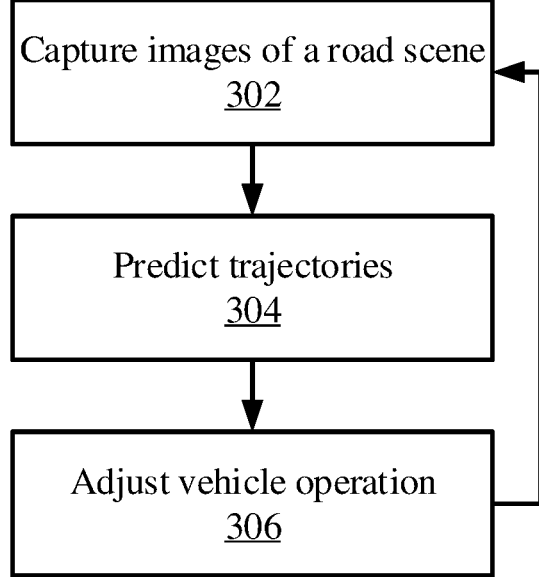
FIG. 3 is a block/flow diagram of a method for automatically operating a self-driving vehicle in response to predicted trajectories for agents in a road scene, in accordance with an embodiment of the present invention.

Referring now to FIG. 3, a method of controlling an autonomous vehicle's operation is shown. Block 302 captures images of a road scene, for example using cameras 104 that are mounted on a vehicle 102. These images may include a variety of features, including road features and pedestrians 116. Block 304 then predicts trajectories of agents in the road scene, for example as described above with respect to FIG. 2.

Based on the identified trajectories, block 306 adjusts vehicle operation to accommodate and avoid the pedestrians 116. If a trajectory indicates that a pedestrian 116 is going to enter a dangerous condition, such as moving into the path of the vehicle 102, block 306 may adjust the vehicle's speed and/or direction to avoid striking the pedestrian 116.

Figure 4:
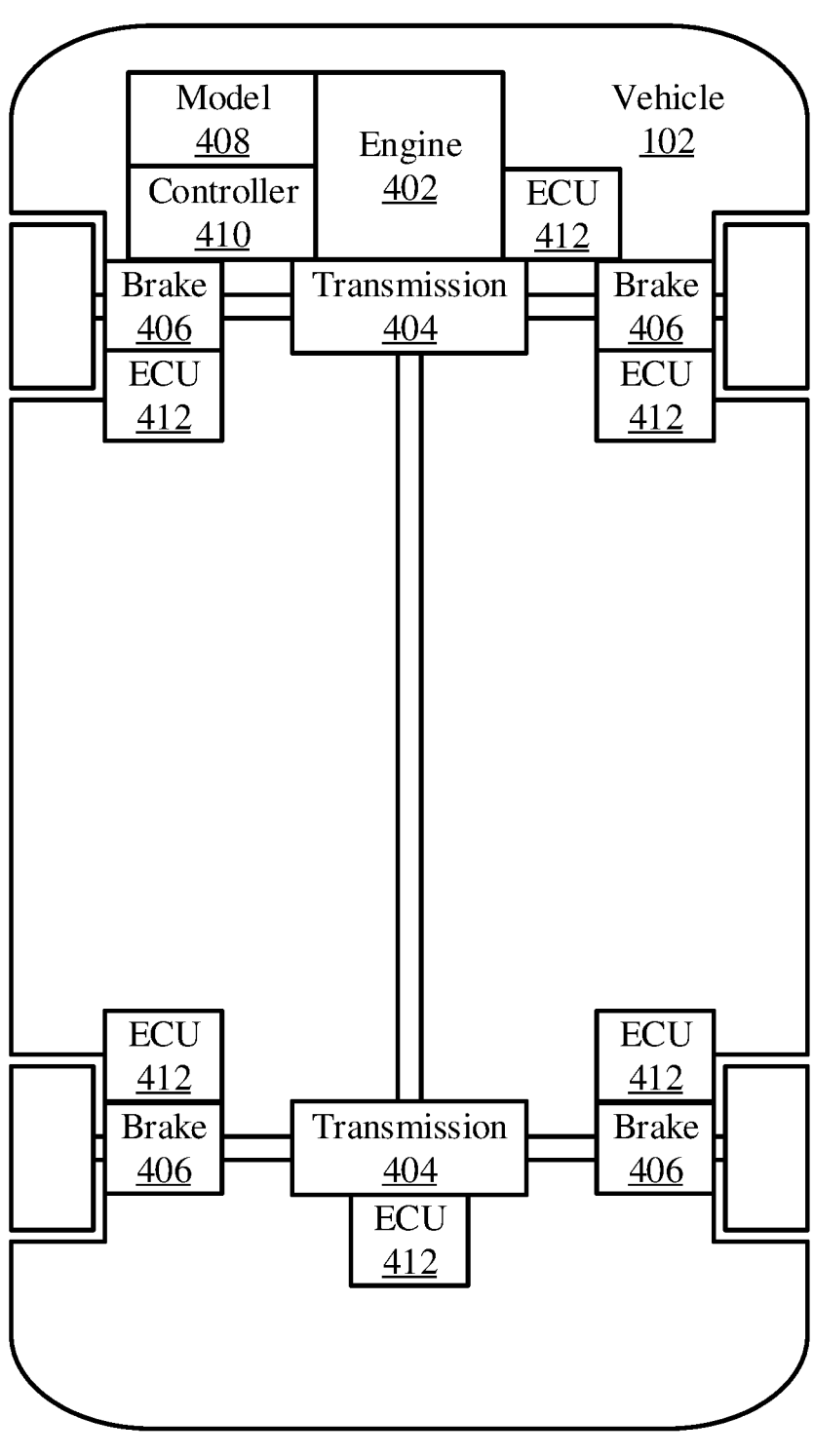
FIG. 4 is a diagram of a self-driving vehicle that can predict and respond to trajectories of agents in a road scene, in accordance with an embodiment of the present invention.

Referring now to FIG. 4, additional detail on a vehicle 102 is shown. A number of different sub-systems of the vehicle 102 are shown, including an engine 402, a transmission 404, and brakes 406. It should be understood that these sub-systems are provided for the sake of illustration, and should not be interpreted as limiting. Additional sub-systems may include user-facing systems, such as climate control, user interface, steering control, and braking control. Additional sub-systems may include systems that the user does not directly interact with, such as tire pressure monitoring, location sensing, collision detection and avoidance, and self-driving.

Each sub-system is controlled by one or more equipment control units (ECUs) 412, which perform measurements of the state of the respective sub-system. For example, ECUs 412 relating to the brakes 406 may control an amount of pressure that is applied by the brakes 406. An ECU 412 associated with the wheels may further control the direction of the wheels. The information that is gathered by the ECUs 412 is supplied to the controller 410.

Communications between ECUs 412 and the sub-systems of the vehicle 102 may be conveyed by any appropriate wired or wireless communications medium and protocol. For example, a car area network (CAN) may be used for communication. The time series information may be communicated from the ECUs 412 to the controller 410, and instructions from the controller 410 may be communicated to the respective sub-systems of the vehicle 102.

The controller 410 uses the fault detection model 408, based on information collected from cameras 104, to identify faults in the road. The model 408 may, for example, output a labeled image of a road scene that is labeled according to faults that have been detected.

The controller 410 may communicate internally, to the sub-systems of the vehicle 102 and the ECUs 412, as well as externally, to a fault remediation agency. For example, the controller 410 may receive model updates from a model training system during deployment 302, and may furthermore provide information relating to detected faults to the fault remediation agency.

Based on pedestrian trajectories, the controller 410 may communicate instructions to the ECUs 412 to avoid a path that would cause injury or damage. For example, the controller 410 may automatically trigger the brakes 406 to slow down the vehicle 102 and may furthermore provide steering information to the wheels to cause the vehicle 102 to avoid the pedestrian.

Figure 5:
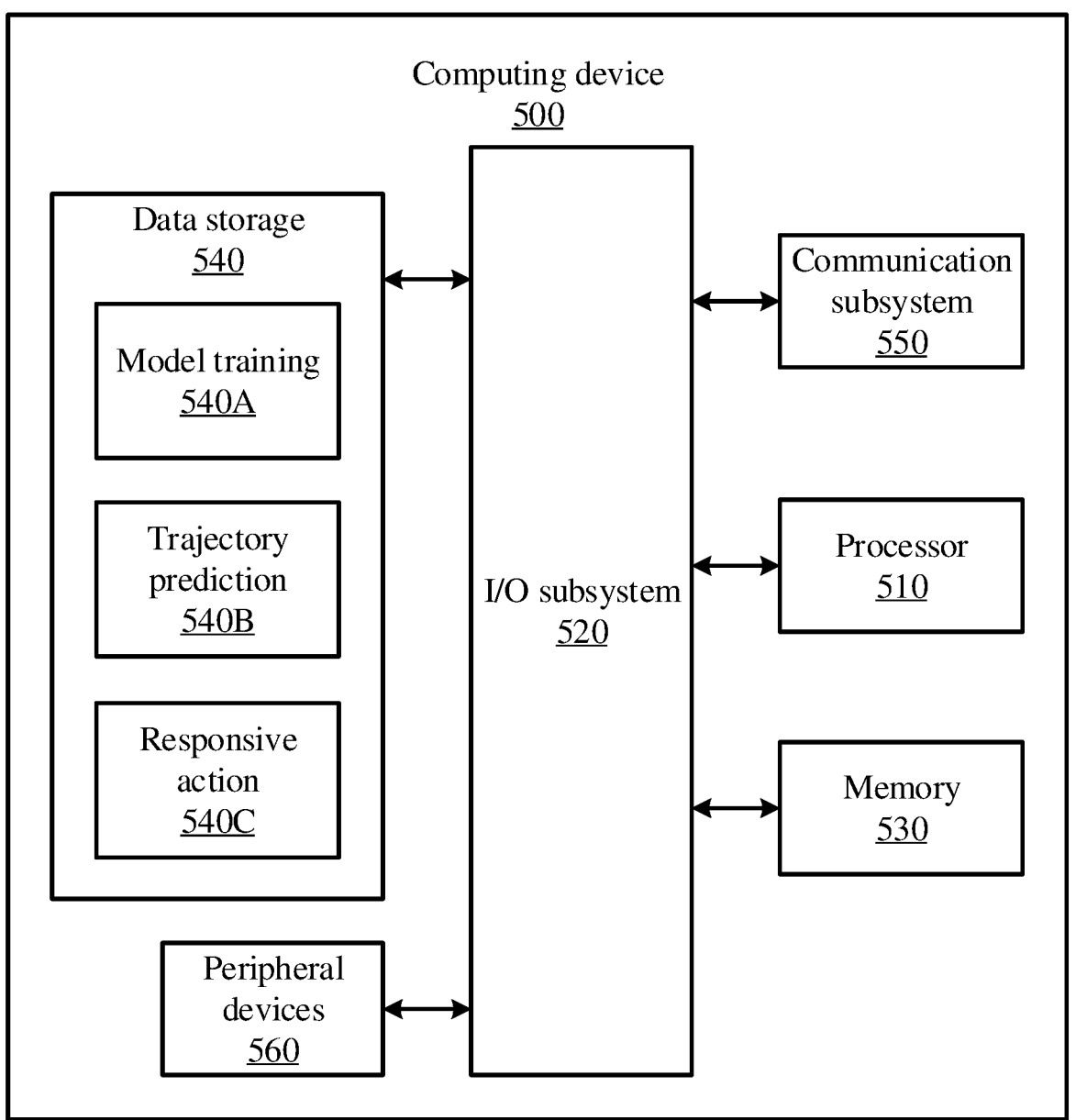
FIG. 5 is a block diagram of a computing device that can predict trajectories of agents in a road scene, in accordance with an embodiment of the present invention.

Referring now to FIG. 5, an exemplary computing device 500 is shown, in accordance with an embodiment of the present invention. The computing device 500 is configured to perform review summarization.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for training a model, 540B for performing trajectory prediction, and/or 540C for performing an automatic action a detected road fault. Any or all of these program code blocks may be included in a given computing system. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

Figure 6:
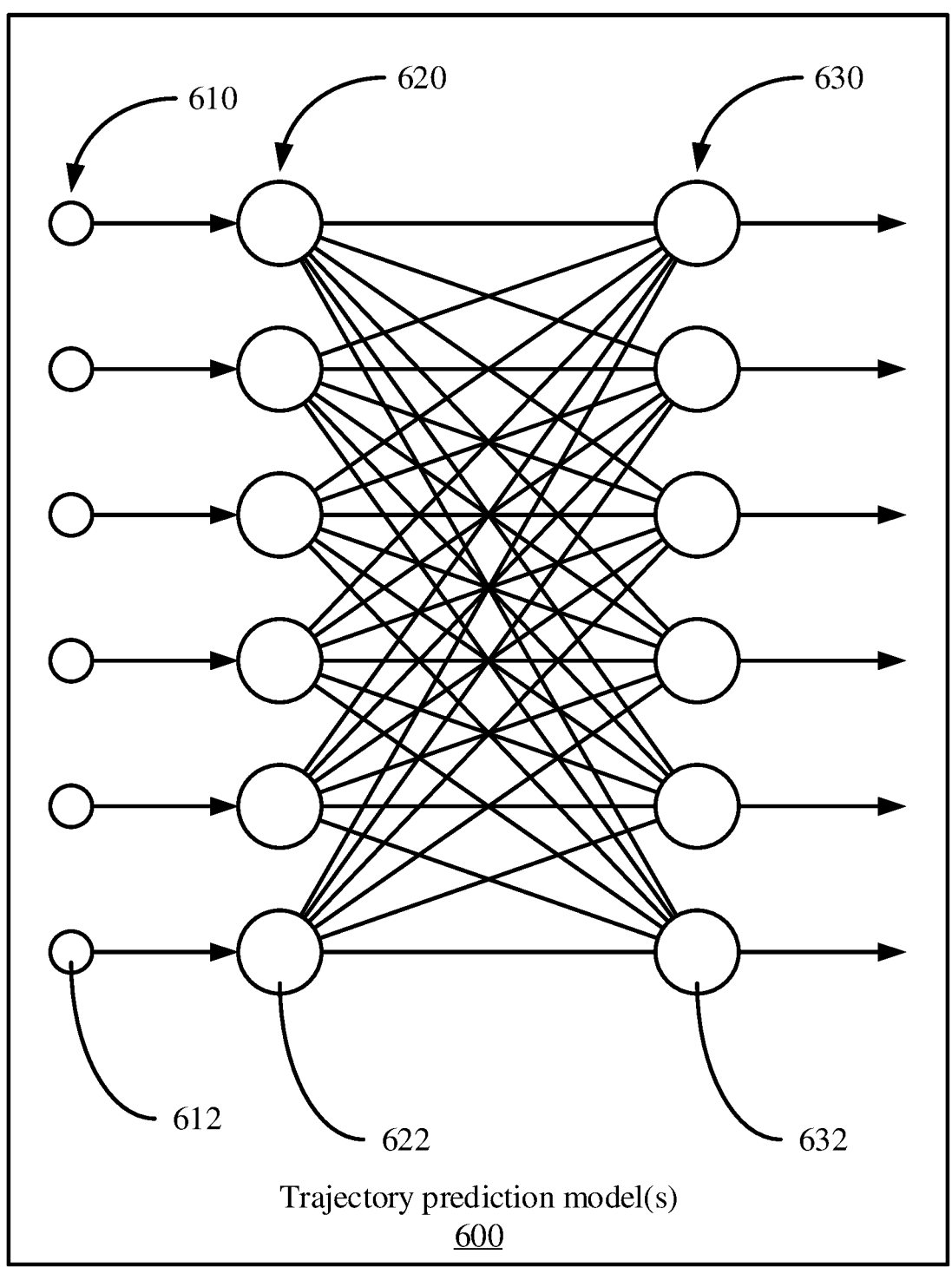
FIG. 6 is a diagram of a neural network architecture that can be used as part of a trajectory prediction model, in accordance with an embodiment of the present invention.
Figure 7:
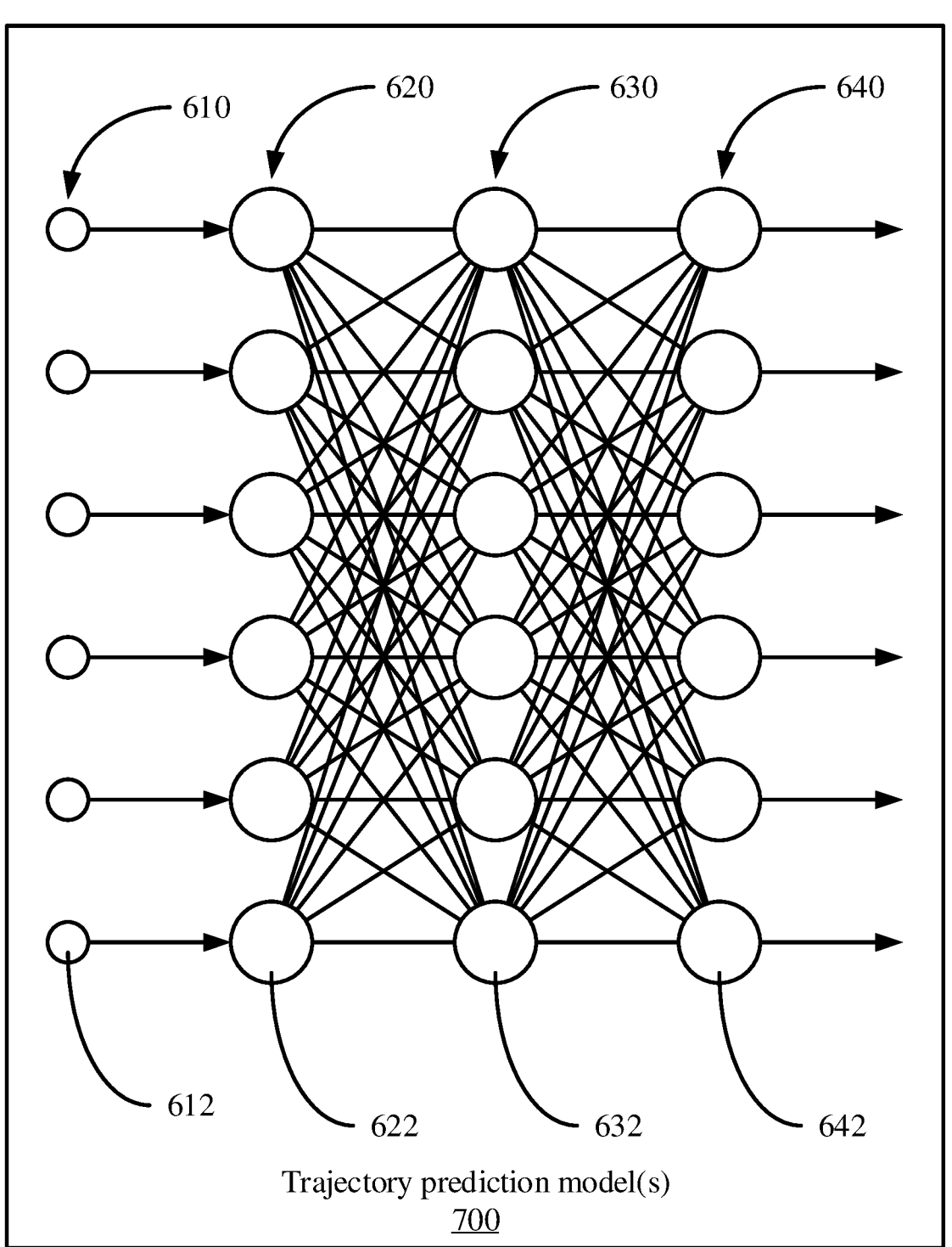
FIG. 7 is a diagram of a deep neural network that can be used as part of a trajectory prediction model, in accordance with an embodiment of the present invention.

Referring now to FIGS. 6 and 7, exemplary neural network architectures are shown, which may be used to implement parts of the present models, such as trajectory prediction model(s) 600/700. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the input data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 620 of source nodes 622, and a single computation layer 630 having one or more computation nodes 632 that also act as output nodes, where there is a single computation node 632 for each possible category into which the input example could be classified. An input layer 620 can have a number of source nodes 622 equal to the number of data values 612 in the input data 610. The data values 612 in the input data 610 can be represented as a column vector. Each computation node 632 in the computation layer 630 generates a linear combination of weighted values from the input data 610 fed into input nodes 620, and applies a non-linear activation function that is differentiable to the sum. The exemplary simple neural network can perform classification on linearly separable examples (e.g., patterns).

A deep neural network, such as a multilayer perceptron, can have an input layer 620 of source nodes 622, one or more computation layer(s) 630 having one or more computation nodes 632, and an output layer 640, where there is a single output node 642 for each possible category into which the input example could be classified. An input layer 620 can have a number of source nodes 622 equal to the number of data values 612 in the input data 610. The computation nodes 632 in the computation layer(s) 630 can also be referred to as hidden layers, because they are between the source nodes 622 and output node(s) 642 and are not directly observed. Each node 632, 642 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 632 in the one or more computation (hidden) layer(s) 630 perform a nonlinear transformation on the input data 612 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for trajectory prediction, comprising:
   encoding trajectories of agents in a scene from past images of the scene;
   encoding lane centerlines for agents in the scene;
   encoding the agents in the scene using the encoded trajectories and the encoded lane centerlines;
   decoding a hypercolumn trajectory from the encoded agents to generate predicted trajectories for the agents;
   ranking the predicted trajectories by diversity using a greedy selection process with a multi-step procedure where, at each step, a prediction is selected which has a maximum averaged L2 difference with respect to the predicted trajectories in a pool of previously selected trajectories; and automatically operating a vehicle responsive to the predicted trajectories, based on the predicted trajectories' ranks.

2. The method of claim 1, wherein encoding the agents includes extracting the hypercolumn trajectory at different scales by bi-linearly interpolating different feature dimensions.

3. The method of claim 1, wherein decoding the hypercolumn trajectory includes applying multiple 1×1 convolutions to produce the predicted trajectories for the agents.

4. The method of claim 1, wherein decoding the hypercolumn trajectory generates the predicted trajectories in normal-tangential coordinates with respect to input lanes.

5. The method of claim 1, wherein encoding the agents includes concatenating features from the encoded trajectories and the encoded lane centerlines.

6. The method of claim 1, wherein encoding trajectories of the agents includes extrapolating from previous measured locations of the agents.

7. The method of claim 1, wherein automatically operating the vehicle includes adjusting a speed or direction of the vehicle to avoid striking an agent.

8. A system for trajectory prediction, comprising:

a hardware processor; and a memory that stores a computer program which, when executed by the hardware processor, causes the hardware processor to:

encode trajectories of agents in a scene from past images of the scene;

encode lane centerlines for agents in the scene;

encode the agents in the scene using the encoded trajectories and the encoded lane centerlines;

decode a hypercolumn trajectory from the encoded agents to generate predicted trajectories for the agents;

rank the predicted trajectories by diversity using a greedy selection process with a multi-step procedure where, at each step, a prediction is selected which has a maximum averaged L2 difference with respect to the predicted trajectories in a pool of previously selected trajectories; and automatically operate a vehicle responsive to the predicted trajectories based on the predicted trajectories' ranks.

9. The system of claim 8, wherein the computer program further causes the hardware processor to extract the hypercolumn trajectory at different scales by bi-linearly interpolating different feature dimensions.

10. The system of claim 8, wherein the computer program further causes the hardware processor to apply multiple 1×1 convolutions to produce the predicted trajectories for the agents.

11. The system of claim 8, wherein the computer program further causes the hardware processor to generate the predicted trajectories in normal-tangential coordinates with respect to input lanes.

12. The system of claim 8, wherein the computer program further causes the hardware processor to concatenate features from the encoded trajectories and the encoded lane centerlines.

13. The system of claim 8, wherein the computer program further causes the hardware processor to extrapolate from previous measured locations of the agents.

14. The system of claim 8, wherein the computer program further causes the hardware processor to automatically adjust a speed or direction of the vehicle to avoid striking an agent.

* * * * *